United States Patent Office 2,710,287
Patented June 7, 1955

2,710,287
RUBBER TREATMENT

Bernard C. Barton, Clifton, and George H. Ganzhorn, Upper Saddle River, N. J., assignors to United States Rubber Company, New York, N. Y., a corporation of New Jersey No Drawing. Application June 29, 1953,
Serial No. 364,958

11 Claims. (Cl. 260—5)

This invention relates to improvements in the technique of processing carbon black and rubber mixes prior to vulcanization thereof.

The technique of processing rubber mixes loaded with carbon black, prior to vulcanization thereof, whereby to obtain vulcanizates with improvements in physical and chemical properties, is described in Gerke et al. U. S. Patent 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

The improved vulcanizates of Gerke et al. are obtained by incorporating uniformly in the rubber a relatively large amount of carbon black, for example, at least 25 parts, and preferably in the case of tire treads at least 40 parts, by weight of carbon black per 100 parts by weight of rubber, and subjecting the mixture to a heat treatment at a temperature substantially above 250° F., the preferred temperature being in the range from about 300° F. to 370° F., and masticating the mix during and/or after such heat treatment, or alternately therewith. The duration of the special heat treatment varies with the temperature employed, the higher the temperature the shorter the time, and is governed also by the degree of change desired in the properties of the ultimate vulcanized product which properties are gauged to be compatible with its final use. In general, heat treatments of from 10 to 60 minutes' duration are said to be suitable for most purposes, particularly within the preferred temperature range.

The principal object of the present invention is to provide new chemical promoters for the processing of rubber and carbon black mixtures at relatively high temperatures, as in processes of the general type disclosed in the above-mentioned Gerke patent. Such processing is often referred to as low-hysteresis processing and is usually designed to produce high electrical resistance and low torsional hysteresis, particularly in rubber stocks used for the manufacture of pneumatic tires and more particularly tread stocks. A further object is to bring about a substantial reduction in the time of such processing by the use of the herein disclosed chemicals whereby an important increase in the capacity and output of the equipment is obtained with the result that such processing is rendered commercially feasible. Other objects and advantages of our invention will more fully hereinafter appear.

The present invention is based upon our discovery that trichloroacetic compounds substantially decrease the time and/or lower the temperature necessary for so-called low-hysteresis processing of rubber and carbon black mixes—that is, the rate of the low-hysteresis-processing reaction, at a given temperature, is materially increased.

The process of our invention comprises mixing rubber with a relatively large amount of a rubber-reinforcing carbon black and a relatively small amount of trichloroacetic compound and heating this mixture at a temperature above 275° F. at which the rubber is not harmed, to bring about the desired changes in the rubber and carbon black mixture. With the resulting heat-treated mixture there are then incorporated vulcanizing and other desired compounding ingredients including conventional accelerators and the like, these being intimately incorporated in any suitable way after which the mixture is shaped and vulcanized in the usual way.

Any carbon black which is capable of reinforcing the rubber can be used in the practice of our invention. We generally employ either furnace black or channel black. It will be understood that the particular type of carbon black will generally be selected with reference to the particular rubber used, this being a matter well within the skill of the art. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can range as high as 100 parts per 100 parts of rubber.

Our invention can be practiced with any vulcanizable, high-unsaturation, aliphatic conjugated diolefin polymer rubber, e. g., Hevea rubber and those synthetic rubbers which are homopolymers or copolymers of aliphatic conjugated diolefins, examples being synthetic polybutadiene and polyisoprene, and copolymers of butadiene or like diolefin with other unsaturated copolymerizable monomeric compounds, e. g., copolymers of butadiene with styrene, alpha-methylstyrene, acrylonitrile, monovinyl-pyridines, ethyl acrylate, methyl vinyl ketone, methyl isopropenyl ketone, methyl acrylate, and methyl methacrylate. By "high-unsaturation" we mean containing at least 25% of combined aliphatic conjugated diolefin.

A great variety of trichloroacetic compounds, characterized by containing the group

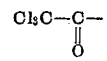

can be used in the practice of our invention. Thus we can use either trichloroacetic acid itself or its amides or its esters, especially esters formed with saturated aliphatic or cycloaliphatic alcohols which can be either monohydric or polyhydric. In the case of the polyhydric alcohol esters of trichloroacetic acid, we prefer to use those esters in which all of the hydroxyl groups are esterified with trichloroacetic acid. Examples of alcohols the trichloroacetic acid esters of which can be used in the practice of our invention include the alkanols, particularly the lower ($C_1$ to $C_6$) alkanols such as methanol, ethanol, pentanol, etc. We can also use esters with the glycols such as ethylene glycol, propylene glycol, butylene glycol, hexamethylene glycol, etc. We can also use esters formed with the cycloalkanols such as cyclopentanol, cyclohexanol, etc. Instead of using the foregoing compounds, we can use the salts of trichloroacetic acid with a metal, including an alkali metal, an alkaline earth metal, magnesium, aluminum, zinc, lead, etc., or with an amine. We prefer not to use salts of metals which have a deleterious effect on the rubber, an example of such a metal being copper.

Typical trichloroacetic compounds which can be used in the practice of our invention include ethyl trichloroacetate, amyl trichloroacetate, hexamethylene bis-trichloroacetate, n-trichloroacetylurea, zinc trichloroacetate, lead trichloroacetate, sodium trichloroacetate, and trichloroacetamide.

We prefer to employ the trichloroacetic compound in an amount which contains from 0.5 to 3.0 parts by weight of the trichloroacetyl group,

per 100 parts of the rubber. Amounts in this range so speed up the attainment of the desired effects of the heat treatment as to be important commercially. Amounts containing less than 0.5 part can be used but do not accelerate the action of the heat treatment to a useful degree. Amounts containing more than 3 parts of the trichloroacetyl group can be used but are uneconomical.

The trichloroacetyl compound should be incorporated with the rubber and carbon black at relatively low temperature, typically not over 225° F., to avoid premature reaction of the trichloroacetyl compound with the rubber. Such premature reaction would lessen the efficiency and effectiveness of our treatment.

In the practice of our invention, the heat treatment of the mixture of rubber, carbon black and trichloroacetyl compound is carried out by mastication at 275°–400° F., with any suitable type of masticating equipment such as an open two-roll rubber mill or more preferably an internal rubber mixer, especially a Banbury mixer. The Banbury mixer is particularly advantageous because it exerts a severe masticatory action upon the charge and because it conserves the heat generated by the mixing action, and this heat greatly aids in elevating the temperature of the stock to within the specified range. Depending upon the size and operating speed of the Banbury mixer, and other factors, extraneous heat may or may not need to be applied to bring the stock temperature within the desired temperature range and hold it there. If desired, extraneous cooling can be applied to keep the temperature from rising above the desired level.

The optimum duration of the heat treatment may vary widely depending upon many factors including the temperature of the heat treatment, type of mixer, type and amount of trichloroacetyl compound, etc. In any case it will be considerably shorter, under like temperature conditions, than the time required when the promoter is omitted. Times of the order of 5 to 20 minutes will generally be adequate for the purposes of our invention.

The following examples illustrate the preferred method of practicing our invention. All parts are by weight.

EXAMPLE 1

A masterbatch is prepared by mixing together 100 parts of natural rubber, 50 parts of carbon black (a medium processing channel black known commercially as "Spheron-6") and 5 parts of stearic acid. This mixing operation is carried out in the conventional manner in a Banbury mixer or on a two-roll rubber mill. To 155 parts of this masterbatch 2 parts of trichloroacetic acid is added on a two-roll rubber mill at 150–250° F. The mixture is then masticated in a Banbury mixer for 10 minutes at 300° F. Thereafter, 2 parts of pine tar, 2 parts of zinc oxide, 1 part of antioxidant, 1 part of accelerator, and 3 parts of sulfur are added on a two-roll rubber mill at 150–200° F. The mixture is placed in a suitable mold and vulcanized for 45 minutes at 287° F. As a control an identical masterbatch is prepared and subjected to all the previously described manipulative steps, except that no trichloroacetic acid is added to the mixture. The specific electrical resistivity and torsional hysteresis are measured, with the following results:

|  | Log Resistivity | Tors. Hyst. (280° F.) |
| --- | --- | --- |
| Control | 6.9 | 0.130 |
| Sample prepared using 2.0 parts trichloroacetic acid | 12.9 | 0.068 |

The practice of the invention has thus raised the specific electrical resistivity by a factor of 1,000,000, and has reduced the torsional hysteresis at 280° F. by 47%.

EXAMPLE 2

In a manner identical with Example 1, a number of experiments are carried out in which different amounts of trichloroacetic acid are added to portions of the masterbatch, and these are masticated in the Banbury for different times at 300° F. The results are shown in Table I.

Table I

| Parts Trichloroacetic Acid | Time of Mastication, minutes | Log Resistivity | Tors. Hyst. (280° F.) |
| --- | --- | --- | --- |
| 0 (Control) | 10 | 6.9 | 0.130 |
| 0.5 | 10 | 8.2 | .101 |
| 1.0 | 10 | 11.5 | .080 |
| 2.0 | 10 | 12.9 | .068 |
| 0 (Control) | 20 | 8.2 | .096 |
| 0.5 | 20 | 10.2 | .084 |
| 1.0 | 20 | 12.5 | .065 |
| 2.0 | 20 | 13.0 | .057 |

These results show that the degree of change in the resistivity and in the torsional hysteresis at 280° F. are dependent both upon the amount of trichloroacetic acid used and upon the duration of the high-temperature mastication.

EXAMPLE 3

To a masterbatch of 100 parts of a butadiene-styrene copolymer ("cold" GR–S, polymerized in emulsion at 41° F.), 50 parts of carbon black (a medium processing channel black known commercially as "Spheron-6"), 6 parts of hydrocarbon oil ("Paraflux") and one part of stearic acid is added trichloroacetamide or ethyl trichloroacetate at 150–250° F. The mixture is then masticated in a Banbury mixer for 10 minutes at 325° F. Vulcanizing ingredients are then added at about 200° F., and the stocks are vulcanized for 30 minutes at 293° F. The data are given in Table II.

Table II

| Chemical | Parts | Time (min.) | Temp., ° F. | Log Resistivity | Tor. Hys. (280° F.) |
| --- | --- | --- | --- | --- | --- |
| None (Control) |  | 10 | 325 | 8.5 | .134 |
| Trichloroacetamide | 2 | 10 | 325 | 12.7 | .097 |
| Ethyl trichloroacetate | 2 | 10 | 325 | 11.0 | .105 |

The data show that these trichloroacetic derivatives are effective in increasing the specific resistivity and reducing the torsional hysteresis at 280° F. of a GR–S and carbon black stock.

EXAMPLE 4

Experiments are carried out in a manner similar to Example 3, except that a blend of 50 parts of Hevea rubber and 50 parts of "cold" GR–S is used. The data are summarized in Table III.

Table III

| Chemical | Parts | Time (min.) | Temp., ° F. | Log Resistivity | Tor. Hys. (280° F.) |
| --- | --- | --- | --- | --- | --- |
| None (Control) |  | 10 | 325 | 8.7 | .096 |
| Trichloroacetamide | 2 | 10 | 325 | 12.3 | .065 |
| Ethyl trichloroacetate | 2 | 10 | 325 | 9.6 | .086 |

These results demonstrate that these trichloroacetic derivatives increase the specific electrical resistivity and lower the torsional hysteresis of rubber and GR–S blends containing carbon black.

Although we have disclosed our invention with particular emphasis upon the preferred practice wherein the heat treatment is accompanied with mastication, nevertheless our invention can be practiced by carrying out the heat treatment under static conditions. For example, we may form an intimate mixture of the rubber, carbon black and trichloroacetyl compound in any suitable manner and then heat this mixture at 275°–400° F. without simultaneously masticating it, the heat-treated mixture being subsequently masticated and compounded with conventional compounding and vulcanizing ingredients. The static heat treatment can be conducted by placing slabs of the stock in an oven heated to a suitable temperature, or slabs of the stock can be stacked and allowed to stand for several hours, preferably under relatively non-heat-conductive conditions in order to maintain the stock at the high temperature for as long as reasonably possible. It may be desirable to surround the slabs of hot stock with a heat-insulating blanket of any suitable type in order that the residual heat of the slabs may be retained as long as possible.

Static heat treatment has the advantage of releasing the milling or Banbury equipment from use for carrying out the heat treatment of our invention, and this may be highly desirable under some conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (in ohm-cms.) is designated "Log resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al. 2,118,601.

Having thus described our invention, what we claim and desire to protect by Letters Patent is:

1. A process which comprises mixing a vulcanizable high-unsaturation rubber containing at least 25% of combined aliphatic conjugated diolefin with a relatively large amount of a rubber-reinforcing carbon black and a relatively small amount of a trichloroacetic compound selected from the group consisting of trichloroacetic acid, its amides, its esters with saturated aliphatic and cycloaliphatic alcohols, and its salts with metals and with amines, heating the mixtures at a temperature above 275° F. at which the rubber is not harmed, masticating the mixture and completing the incorporation of vulcanizing and other desired ingredients, shaping the mass, and vulcanizing the resulting shaped mass.

2. A process which comprises mixing a vulcanizable high-unsaturation rubber containing at least 25% of combined aliphatic conjugated diolefin with a relatively large amount of a rubber-reinforcing carbon black and a relatively small amount of a trichloroacetic compound selected from the group consisting of trichloroacetic acid, its amides, its esters with saturated aliphatic and cycloaliphatic alcohols, and its salts with metals and with amines, masticating the mixture at a temperature above 275° F. but not over 400° F., thereafter incorporating vulcanizing and other desired ingredients, shaping the mass, and vulcanizing the resulting shaped mass.

3. A process which comprises mixing natural rubber with a relatively large amount of a rubber-reinforcing carbon black and a trichloroacetic compound selected from the group consisting of trichloroacetic acid, its amides, its esters with saturated aliphatic and cycloaliphatic alcohols, and its salts with metals and with amines in amount such as to contain from 0.5 to 3.0 parts of the trichloroacetyl group per 100 parts of said rubber, masticating the mixture at a temperature above 275° F. but not over 400° F., thereafter incorporating vulcanizing and other desired ingredients, shaping the mass, and vulcanizing the resulting shaped mass.

4. A process which comprises mixing a butadiene-styrene rubbery copolymer with a relatively large amount of a rubber-reinforcing carbon black and a trichloroacetic compound selected from the group consisting of trichloroacetic acid, its amides, its esters with saturated aliphatic and cycloaliphatic alcohols, and its salts with metals and with amines in amount sufficient to contain from 0.5 to 3.0 parts of the trichloroacetyl group per 100 parts of said copolymer, masticating the mixture at a temperature above 275° F. but not over 400° F., thereafter incorporating vulcanizing and other desired ingredients, shaping the mass, and vulcanizing the resulting shaped mass.

5. A process which comprises mixing rubber comprising natural rubber and a butadiene-styrene rubbery copolymer with a relatively large amount of a rubber-reinforcing carbon black and a trichloroacetic compound selected from the group consisting of trichloroacetic acid, its amides, its esters with saturated aliphatic and cycloaliphatic alcohols, and its salts with metals and with amines in amount sufficient to contain from 0.5 to 3.0 parts of the trichloroacetyl group per 100 parts of said rubber, masticating the mixture at a temperature above 275° F. but not over 400° F., thereafter incorporating vulcanizing and other desired ingredients, shaping the mass, and vulcanizing the resulting shaped mass.

6. A process which comprises mixing natural rubber with a relatively large amount of a rubber-reinforcing carbon black, and a small amount of trichloroacetic acid, masticating the mixture at a temperature above 275° F. but not over 400° F., thereafter incorporating vulcanizing and other desired ingredients, shaping the mass, and vulcanizing the resulting shaped mass.

7. A process which comprises mixing natural rubber with a relatively large amount of a rubber-reinforcing carbon black, and trichloroacetamide, masticating the mixture at a temperature above 275° F. but not over 400° F., thereafter incorporating vulcanizing and other desired ingredients, shaping the mass, and vulcanizing the resulting shaped mass.

8. A process which comprises mixing natural rubber with a relatively large amount of a rubber-reinforcing carbon black, and ethyl trichloroacetate, masticating the mixture at a temperature above 275° F. but not over 400° F., thereafter incorporating vulcanizing and other desired ingredients, shaping the mass, and vulcanizing the resulting shaped mass.

9. A process which comprises mixing a rubbery butadiene-styrene copolymer with a relatively large amount of a rubber-reinforcing carbon black, and trichloroacetic acid, masticating the mixture at a temperature above 275° F. but not over 400° F., thereafter incorporating vulcanizing and other desired ingredients, shaping the mass, and vulcanizing the resulting shaped mass.

10. A process which comprises mixing a rubbery butadiene-styrene copolymer with a relatively large amount of a rubber-reinforcing carbon black, and trichloroacetamide, masticating the mixture at a temperature above 275° F. but not over 400° F., thereafter incorporating vulcanizing and other desired ingredients, shaping the mass, and vulcanizing the resulting shaped mass.

11. A process which comprises mixing a rubbery butadiene-styrene copolymer with a relatively large amount of a rubber-reinforcing carbon black, and ethyl trichloroacetate, masticating the mixture at a temperature above 275° F. but not over 400° F., thereafter incorporating vulcanizing and other desired ingredients, shaping the mass, and vulcanizing the resulting shaped mass.

References Cited in the file of this patent

UNITED STATES PATENTS

| | | |
|---|---|---|
| 2,315,856 | Howland et al. | Apr. 6, 1943 |
| 2,650,092 | Barton | Nov. 3, 1953 |